United States Patent
Vestergaard

[11] Patent Number: 6,030,568
[45] Date of Patent: *Feb. 29, 2000

[54] METHOD AND AN APPARATUS FOR THE PRODUCTION OF A FIBRE REINFORCED THREE-DIMENSIONAL PRODUCT

[76] Inventor: Torben Vestergaard, Skaldhøjvej 12, DK-8981, Spentrup, Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 08/765,266

[22] PCT Filed: Jun. 22, 1995

[86] PCT No.: PCT/DK95/00260

§ 371 Date: Dec. 20, 1996

§ 102(e) Date: Dec. 20, 1996

[87] PCT Pub. No.: WO95/35200

PCT Pub. Date: Dec. 28, 1995

[30] Foreign Application Priority Data

Jun. 22, 1994 [DK] Denmark .................................. 0740/94

[51] Int. Cl.[7] ...................................................... B28B 3/00
[52] U.S. Cl. ............................ 264/258; 264/231; 264/322; 264/324; 264/263; 156/166; 156/296; 156/242; 156/245; 425/521; 425/406; 425/DIG. 37; 425/DIG. 38; 425/DIG. 48
[58] Field of Search ........................ 264/258, 231, 264/322, 324, 263; 425/521, 406, DIG. 37, DIG. 38, DIG. 48; 156/166, 296, 242, 245

[56] References Cited

U.S. PATENT DOCUMENTS

| | | | |
|---|---|---|---|
| 1,482,185 | 1/1924 | Egerton | 264/258 |
| 1,587,462 | 6/1926 | Adams et al. | 264/324 |
| 1,595,346 | 8/1926 | Long et al. | 264/324 |
| 1,601,911 | 10/1926 | Godfrey | 264/258 |
| 1,638,012 | 8/1927 | Hoof | 264/258 |
| 1,640,543 | 8/1927 | Gudge | 264/258 |
| 1,913,473 | 6/1933 | Brennecke | 264/258 |
| 2,387,778 | 10/1945 | Stocking | 264/258 |
| 2,417,510 | 3/1947 | McGinnis | 264/324 |
| 2,621,140 | 12/1952 | Bitterli et al. | 264/258 |
| 2,844,354 | 7/1958 | Warnken | 253/77 |
| 3,621,092 | 11/1971 | Hofer | 264/324 |
| 3,651,191 | 3/1972 | Glatt et al. | 264/153 |
| 4,026,749 | 5/1977 | Appelhans et al. | 156/252 |
| 4,404,156 | 9/1983 | Ogletree | 264/162 |
| 4,416,716 | 11/1983 | Ichikawa et al. | 264/322 |
| 4,432,716 | 2/1984 | Kiss | 264/324 |
| 4,876,055 | 10/1989 | Cattanach | 264/322 |
| 4,944,668 | 7/1990 | Asano et al. | 264/322 |
| 4,946,640 | 8/1990 | Nathoo | 264/324 |
| 5,040,962 | 8/1991 | Waszeciak | 425/112 |
| 5,066,351 | 11/1991 | Knoll | 264/322 |
| 5,085,928 | 2/1992 | Krueger | 428/287 |
| 5,312,579 | 5/1994 | Druyun et al. | 264/258 |
| 5,415,536 | 5/1995 | Ohno | 264/322 |
| 5,639,411 | 6/1997 | Wilkins et al. | 264/231 |

FOREIGN PATENT DOCUMENTS

| | | | |
|---|---|---|---|
| 0133893 | 3/1985 | European Pat. Off. | B29C 67/14 |
| 0138294 | 4/1985 | European Pat. Off. | B29C 67/14 |
| 0202041 | 11/1986 | European Pat. Off. | B29C 51/14 |
| 0495427 | 7/1992 | European Pat. Off. | B29C 67/18 |
| 2633213 | 12/1989 | France | B29C 67/14 |
| 1441362 | 1/1969 | Germany . | |
| 6-155483 | 3/1994 | Japan . | |
| 9009881 | 9/1990 | WIPO | B29C 67/14 |

Primary Examiner—Jan H. Silbaugh
Assistant Examiner—Robin S. Gray
Attorney, Agent, or Firm—Ladas & Parry

[57] ABSTRACT

A method for producing a fibre reinforced three-dimensional product comprises depositing of long fibers in a mould consisting of a frame in which a carrier net for the fibers is suspended. The individual layers of a formed plane laminate are positioned in such a manner that only a first end is secured at a frame side. Said first ends are secured at different frame sides. In this manner it is possible, in a pressing procedure giving the product is three-dimensional shape, to obtain a virtually even distribution of the fibres, even in areas which are subjected to the longest move away from the plane original laminate. In this manner sound well-defined properties are obtained in the three-dimensional product formed.

11 Claims, 5 Drawing Sheets

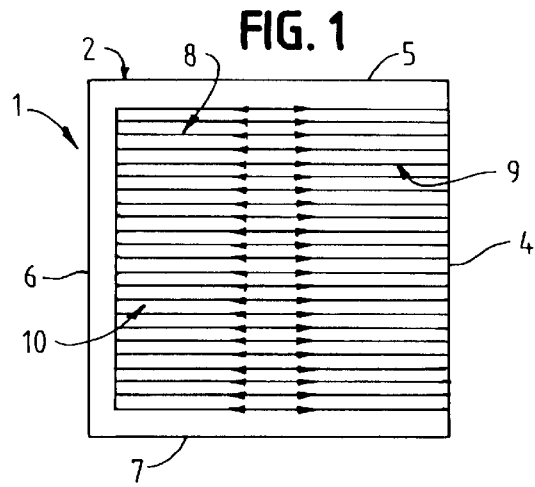
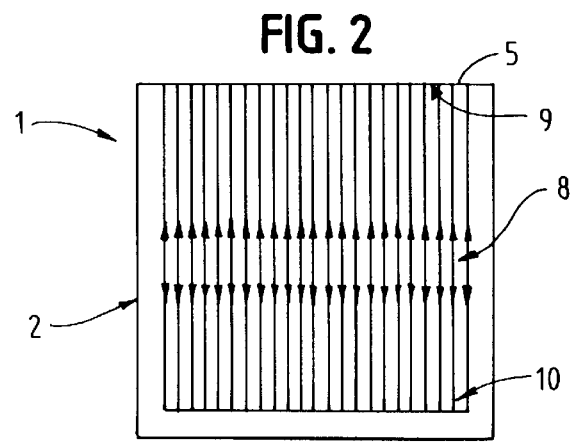
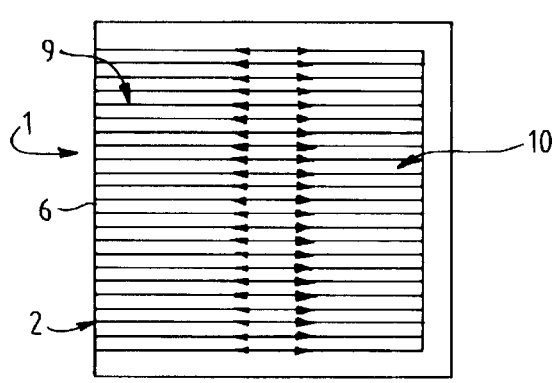
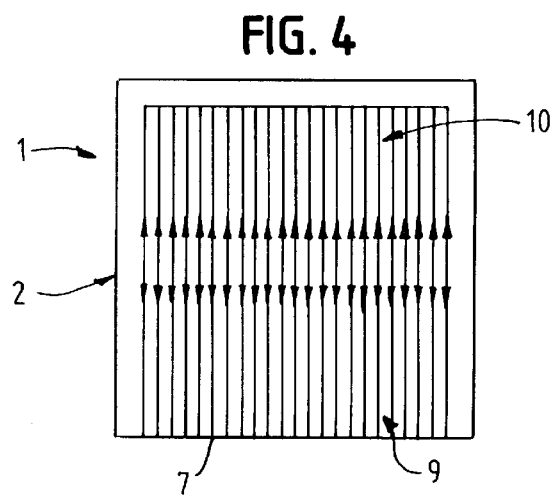

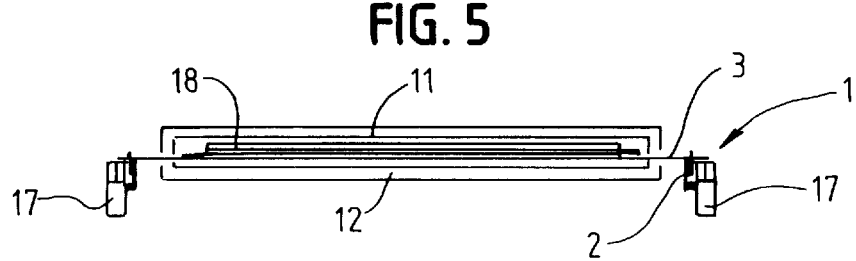
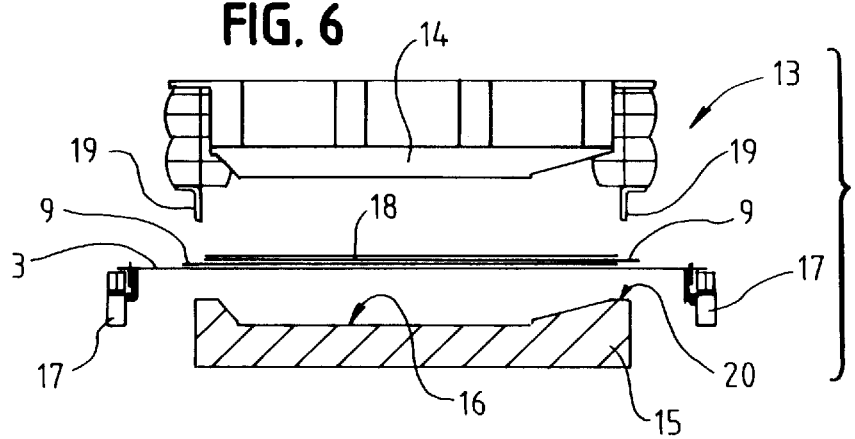
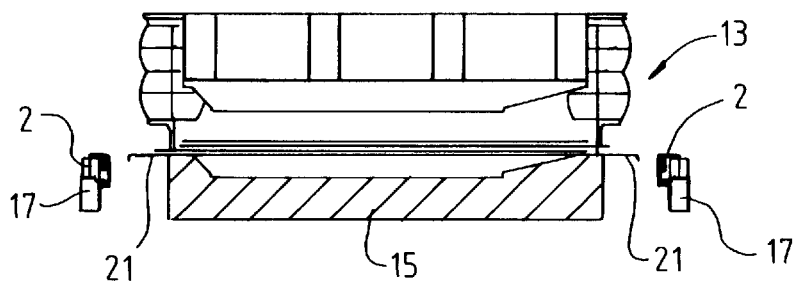
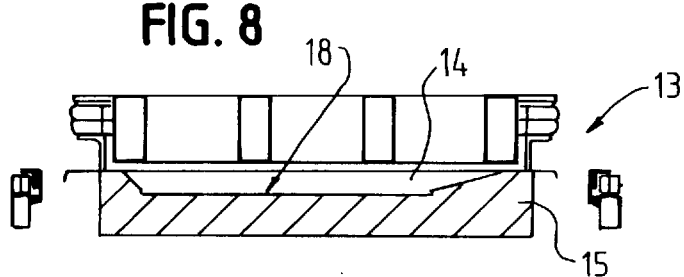

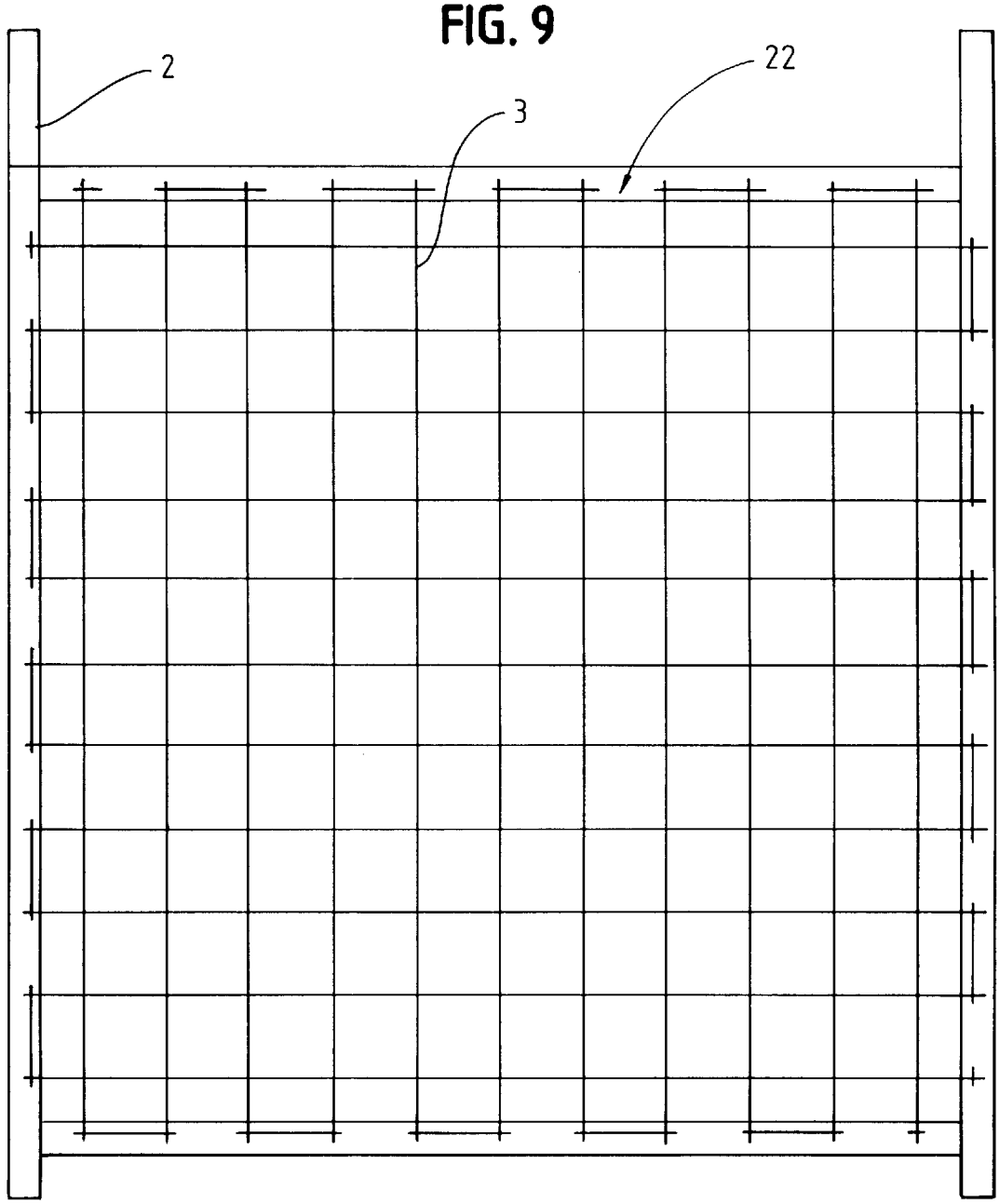
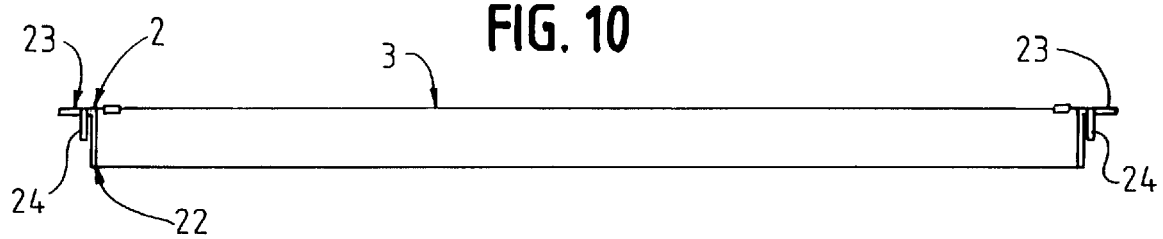

METHOD AND AN APPARATUS FOR THE PRODUCTION OF A FIBRE REINFORCED THREE-DIMENSIONAL PRODUCT

DESCRIPTION

The present invention relates to a method for producing a fibre reinforced three-dimensional product of a plastic material by using a mould in which the product is formed, wherein a plane laminate of crossing fibre arrangements is formed containing long fibres which are uniformly oriented and which are mixed with a plastic matrix.

Methods of the type mentioned in the introduction are known wherein, during application of a three-dimensional shape, the formed plane laminate is not secured in the mould in which it is deposited. If short or cut fibres are used for reinforcement of the plastic material, the material will normally not be secured. Owing to this, it is not possible to control the orientation and distribution of the fibres when the product is given a three-dimensional shape. Thus, the finished and three-dimensional product will not always have well-defined material properties throughout its extent.

A method is known from U.S. Pat. No. 5,312,579 for the manufacture of a laminate. According to this method prepreg plies each consists of unidirectional fibres. It is described that moulding stops are used and that the plies are arranged within the mould. It is the object to ensure that no air is entrapped in the laminate. There is no mentioning of any method of securing the prepreg plies in relation to any of the mould parts. Accordingly, if the product should be given a three-dimensional shape then there would be no control of the orientation of the fibres as explained above.

Methods are also known, e.g. from EP-A-0,202,041, wherein the plane laminate is secured partially in all directions so that a displacement of the deposited material is possible when it is given a three-dimensional shape.

Such potential for displacement in the material means that the orientation of the reinforcement fibres in the end product does not correspond to the orientation that the reinforcement fibres are given in the deposited plane laminate before a three-dimensional shape is applied to it. Thus, in the three-dimensional end product there will be larger distance between individual reinforcement fibres when an object is given a three-dimensional shape that is different from a plane deposit. Thus, at the same thickness of material throughout the surface of the object, the percentage content of reinforcement fibres will fall and become less the larger the distance from a plane original laminate. As a result of this lower content of reinforcement fibres, there will appear falling strength in such parts of the finished product.

It is noted that the production of a three-dimensional product may take place by depositing a number of layers on a three-dimensional shape, such as described e.g. in U.S. Pat. No. 4,404,156 and U.S. Pat. No. 5,312,579. However, a method for a mass production industry would preferably use the method where a plane laminate is formed initially which is subsequently given its three-dimensional shape by pressing/deep pressing the previously formed laminate.

The present invention is primarily intended for this method, but the method may also be used in the production of plane products or substantially plane products in which it is possible to provide the long fibres with a predefined orientation. In this manner, the finished product may be given various mechanical properties such as different strengths in different orientations.

It is the object of the present invention to remedy the disadvantages of the known methods by disclosing a method and a mould wherein long unidirectional fibres are used which will be evenly distributed even in areas of the finished product which has been subjected to the largest three-dimensional displacement in relation to the plane deposited laminate.

This is achieved according to the present invention by a method which is characterized in that the laminate is deposited loosely on a carrier net with first ends of the long fibres projecting out from the laminate, that the deposited product is heated, that only said first ends of the long fibres are securing secured by securing member in the edge are of the mould, the securing members being activated while second ends are free in the mould as they do not reach a diametrically opposite side of the mould, that the carrier net is released from the frame, that the heated plane laminate is pressed into the desired three-dimensional shape of the product under continued securing of the fibres at said first ends, and that the product is released and removed from the mould.

An apparatus for use by the method comprises a mould which has members along its mould edges for securing the reinforcement fibres and which is characterized in that the apparatus comprises a carrier frame provided with a carrier net which is suspended in the frame and which serves as support for the loosely deposited fibre arrangements, and a pressing frame having members which cooperate with the mould members in securing the reinforcement fibres only at the first ends projecting out from the laminate.

Since the fibre arrangement is secured in the mould by means of the cooperating securing members of the pressing frame and the mould at the first ends of the fibres, it is possible for the individual layer to move freely along the other sides and to a certain extent also in the plane during the application of a three-dimensional shape. In most cases, the mould used will be a quadrangular mould and the free mobility is consequently possible along the other three sides of a fibre arrangement. The laminate is heated to the processing temperature that applies to the chosen matrix material. The heating will initiate a chemical reaction in the matrix material if a hardening plastic is used. When using thermoplastic matrix materials, the laminate is kept at the processing temperature of the chosen matrix material until the consolidation during the pressing has been completed.

When a pressure is established, the individual layers of the deposited laminate will enter into close contact with each other and since the matrix material will at the same time consolidate during the pressing, the product will be in its three-dimensional shape. During this shaping, the fibres will be secured at the first ends and consequently they will retain their orientation during and after the three-dimensional shaping.

Even in the area that is given the largest distance away from the plane original laminate, the fibres will be evenly distributed throughout the product surface. As a result thereof, better and more well-defined mechanical properties may be obtained in the formed three-dimensional product.

In this method it is possible that the long fibres extend wavily, although having a main orientation.

In the method according to the invention the mould used will frequently be a polygonal, preferably quadrangular one. It is possible, however, to use moulds with any outer contours. It only has to be ensured that the long fibres are only secured at their first ends and do not extend to a diametrically opposite mould edge.

In order to have the best possible profit from the invention, a laminate should preferably consist of at least four layers of fibre arrangements, each having a fixed direction of orientation. In the depositing of the fibre arrangements on the carrier net, which is subsequently placed in a polygonal mould, each subsequent fibre arrangement will be placed with the first ends of the fibres in a position corresponding to one of the sides of the mould edge. The succeeding layer will be placed with its first ends at a mould edge adjacent to the mould edge used for the layer deposited immediately before. Thus, more layers are produced until there is sufficient material for the establishment of the desired material thickness of the finished product. Depositing is continued until the desired amount of material has been deposited on the carrier net. As mentioned, a matrix of hardening plastic or thermoplastic may be used. According to preferred embodiments, epoxy or polyester is used as matrix.

With the apparatus according to the invention the method will be suited for industrial use. The frame is provided with a suspended carrier net wherein each thread of the net preferably consists of reinforcement fibres, which may be mixed with the same matrix as has been used in the fibre arrangement. Alternatively, the net thread may be composed of pure reinforcement fibres or be mixed with an alien matrix which is different from the matrix used in the fibre arrangement. A simple structure is obtained wherein the deposited laminate may be conducted through different stations in which the method is exerted at the same time as the carrier net may enter as part of the finished product.

As the product is deposited on the carrier frame, and since the mould and the pressing frame, which has a smaller extent than the carrier frame, comprise the members for securing the fibres, the handling equipment is simplified. Thus it is possible to use a surface of the mould which co-operates with a surface of the pressing frame which is simultaneously used for giving the product its three-dimensional shape. When upon heating the product is pressed and simultaneously secured as described above, the carrier net may be released from the carrier frame and enter into the finished product when the pressing frame presses down onto and holds the laminate on holding surfaces of a mould. When the carrier net is composed of reinforcement fibres corresponding to those used for the product, a particularly preferable application of the method is obtained.

DESCRIPTION OF THE DRAWINGS

The invention will now be explained in further detail below with reference to the accompanying drawing, wherein:

FIGS. 1–8 show an embodiment of a method according to the invention wherein pressing is being performed which gives the product its three-dimensional shape, FIG. 9 shows a plane view of a mould for use by the method according to the invention, FIG. 10 shows a side view of the mould shown in FIG. 9, FIGS. 11 and 12 show partial, sectional views through a second embodiment of the mould for use by the method according to the present invention.

In the various figures of the drawings, identical or corresponding elements have been designated by the same reference numerals and which will not be explained in detail in connection with each figure.

FIGS. 1–4 schematically show a carrier frame 1 for use by the method according to the invention. The mould of the embodiment shown consists of a quadrangular frame 2 in which a carrier net 3 is suspended (see FIG. 5). The frame 2 has a first frame side 4, a second frame side 5, a third frame side 6, and a fourth frame side 7. According to the method a laminate consisting of several layers is deposited. FIG. 1 shows how a first layer of a fibre arrangement 8 with long unidirectional fibres mixed with plastic has been deposited with first ends 9 at a first frame side 4. The fibres 8 have such length that the second ends 10 of the fibres do not reach the diametrically opposite frame side (the third frame side 6). The next layer is deposited with first ends 9 of the fibres at the second frame side 5. The second ends 10 of the fibres 8 in the second layer will also not reach the diametrically opposite frame side (the fourth frame side 7). Thereafter the third layer of fibres 8 is deposited in a similar manner with the first ends 9 at the third frame side 6, such as seen in FIG. 3. Then the fourth layer is deposited with first ends 9 of the fibres 8 at the fourth frame side 7.

Figure 11:
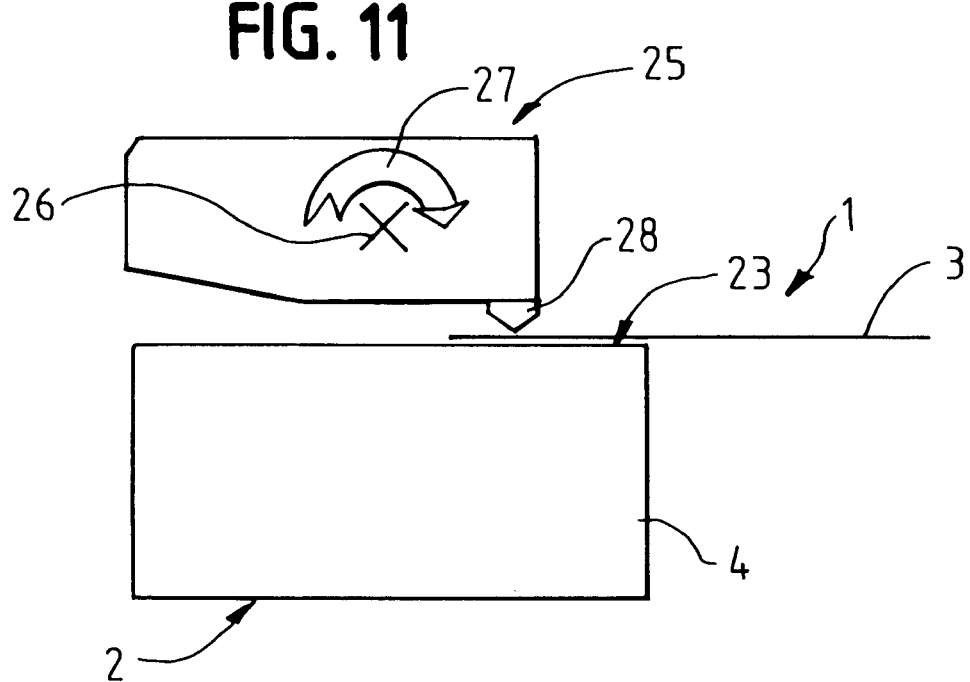

It is possible to continue depositing until the desired thickness of material has been obtained.

After the desired number of layers has been deposited and a plane laminate with a desired thickness has been formed, the first ends 9 of the fibres 8 are projecting from the formed laminate whereas their second ends 10 will be disposed freely inside the formed laminate 18 (see FIG. 5).

The succeeding steps will be explained now with reference to FIGS. 5 to 8 which show schematic sectional views through carrier net 3, carrier frame 2, pressing frame and mould.

Afterwards the laminate 18 lying on the carrier net 3 is carried to a succeeding process step, which is illustrated in FIG. 5. Here the laminate is heated by contact heating between two heated surfaces 11, 12 to a temperature immediately below the sticking temperature of the plastic. However, the temperature is as high as possible without the material sticking to the heating surfaces 11, 12 used.

After this heating the carrier net 3 with the laminate 18 deposited thereon is carried to a further process step (not shown) in which the laminate is heated to the process temperature, preferably in a hot-air oven. Alternatively the heating to the process temperature may take place by means of other heat sources, such as radiated heat.

The laminated thus heated is then carried to a process step shown in FIG. 6. In this step the carrier frame 1 with the deposited laminate is introduced between a pressing frame 13, comprising a positive mould part 14, and a lower mould 15, comprising a negative mould part 16. The carrier net 3 is transported from the preceding process step and through a succeeding process step by means of transport equipment 17 supporting the frame 2. The transport equipment 17 is comprised of rails placed at such mutual distance that the formed laminate 18 is located in the middle of the carrier net 3 at a distance from the frame sides resting on the transport equipment 17. Thus, there is room for the heating members in the shape of the heating surfaces 11, 12 and the hot-air oven not shown to encircle the whole laminate without having to encircle the frame 2 and the transport equipment 17. If the frame 2 and the carrier equipment were to be located within the heating members, there would be a heavy thermal load and resulting attrition.

After the laminate 18 has been positioned between the pressing frame 13 and the mould 15, the pressing frame 13 is moved down towards the mould 15. This actuates the securing members in the shape of co-operating surfaces 19 on the pressing frame and a surface 20 on the mould 15. This situation is illustrated in FIG. 7. It appears therefrom that the securing members 19, 20 in the edge area of the mould 15 secure the first ends 9 of the long fibres of the respective fibre arrangements or layers in the laminate. The second ends 10 of the fibres will be disposed freely inside the laminate.

At the same time as the laminate is secured by the securing members 19, 20, the carrier net 3 is released from the frame 2. Thus, there will appear freely projecting ends 21 hanging outisde the mould 15. These freely projecting ends 21 are removed subsequently by cutting or trimming when the product has been given its three-dimensional shape.

The succeeding process step is seen in FIG. 8 where the product is given its three-dimensional shape, as the pressing frame 13 is displaced further down towards the mould 15 so that the positive mould part 14 is introduced into the negative mould part 16, the laminate 18 placed between them obtaining simultaneously its three-dimensional shape. As the mould is closing, the laminate 18 is consolidated in its final shape. This takes place within very few seconds. Thereafter the pressing frame 13 is lifted free, and the product may be released and removed from the mould 15. The finished three-dimensional product is then ready for further handling.

A more detailed view of a frame 2 provided with a carrier net 3 is seen in FIGS. 9 and 10. Two opposite frame sides, optionally first and third or second and fourth frame sides, are formed by a profile 22 which allows transport of the frame by means of the automatic transport system 17 through the different process steps.

The frame 2 has a plane upper surface 23. Pistons 24 extend through the upper surface 23 and are able to be displaced upwards over the plane upper surface 23 or to be displaced downwards under the plane upper surface 23 of the frame. When the pistons 24 have been displaced upwards over the plane upper surface 23, the threads of the carrier net are put around the projecting pistons 24 in a way shown in FIG. 10.

Other patterns of the carrier net design are also possible, however. When the carrier net 3 is released from the frame 2, such as described above, it takes place by the pistons 24 being moved down under the plane upper surface 23 of the frame 2. In this situation the frame 2 may be returned to the starting position of the process where the pistons are again displaced upwards over the upper surface 23 in order to be provided again with a new carrier net 3. The passage of frame 2 through the different process steps may take place continuously and automatically on the transport equipment 17.

Figure 12:
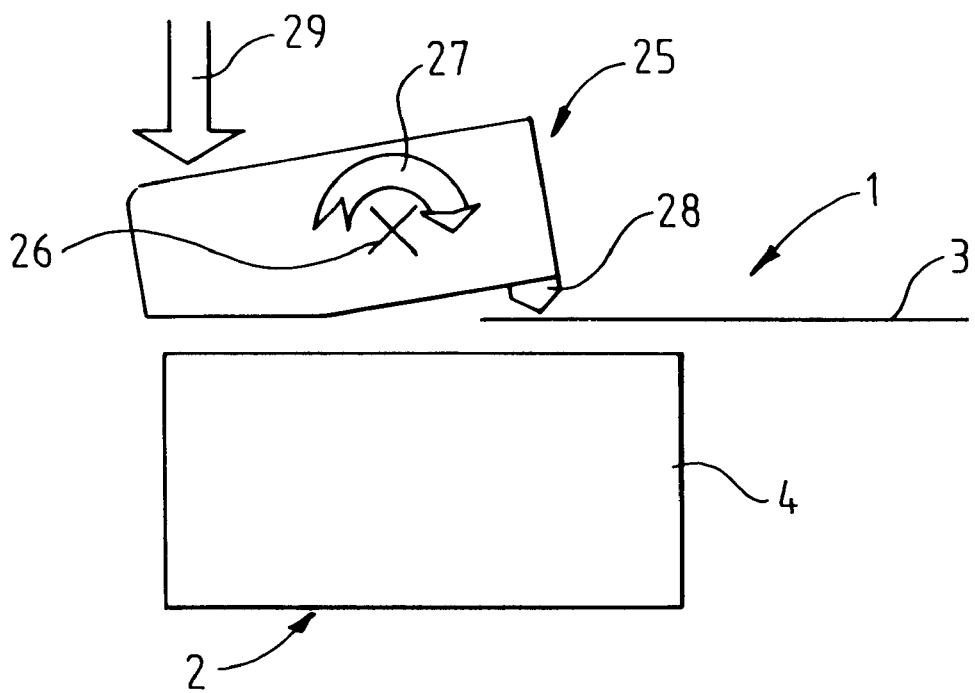

FIGS. 11 and 12 schematically show a second embodiment of the way in which the carrier net 3 is secured to the frame 2. For the sake of convenience, the frame 2 is solely illustrated with its first frame side 4. The frame 2 has a plane upper surface 23. In the upper surface there may alternatively be provided tracks or grooves in which elastic flexible elements are mounted against which the carrier net 3 is secured. For securing the carrier net a clip 25 is used for each thread forming part of the carrier net 3. The clip 25 is fixed around an axis 26 and is connected with a torsion spring 28 which gives a force component 27 causing a projection 28 to become clasped against the plane upper surface 23 of the frame 2 in order to fasten a thread of the carrier net 3 between them.

Thus, due to the torsion force 27 the carrier net 3 will be secured in the carrier frame 1. When the carrier net 3 is to be released from the frame 2, such as described above, a force 29 is applied to the clip 25 so that it turns against the direction of the torsion force 27. In this manner the carrier net 3 is released.

Figure 13:
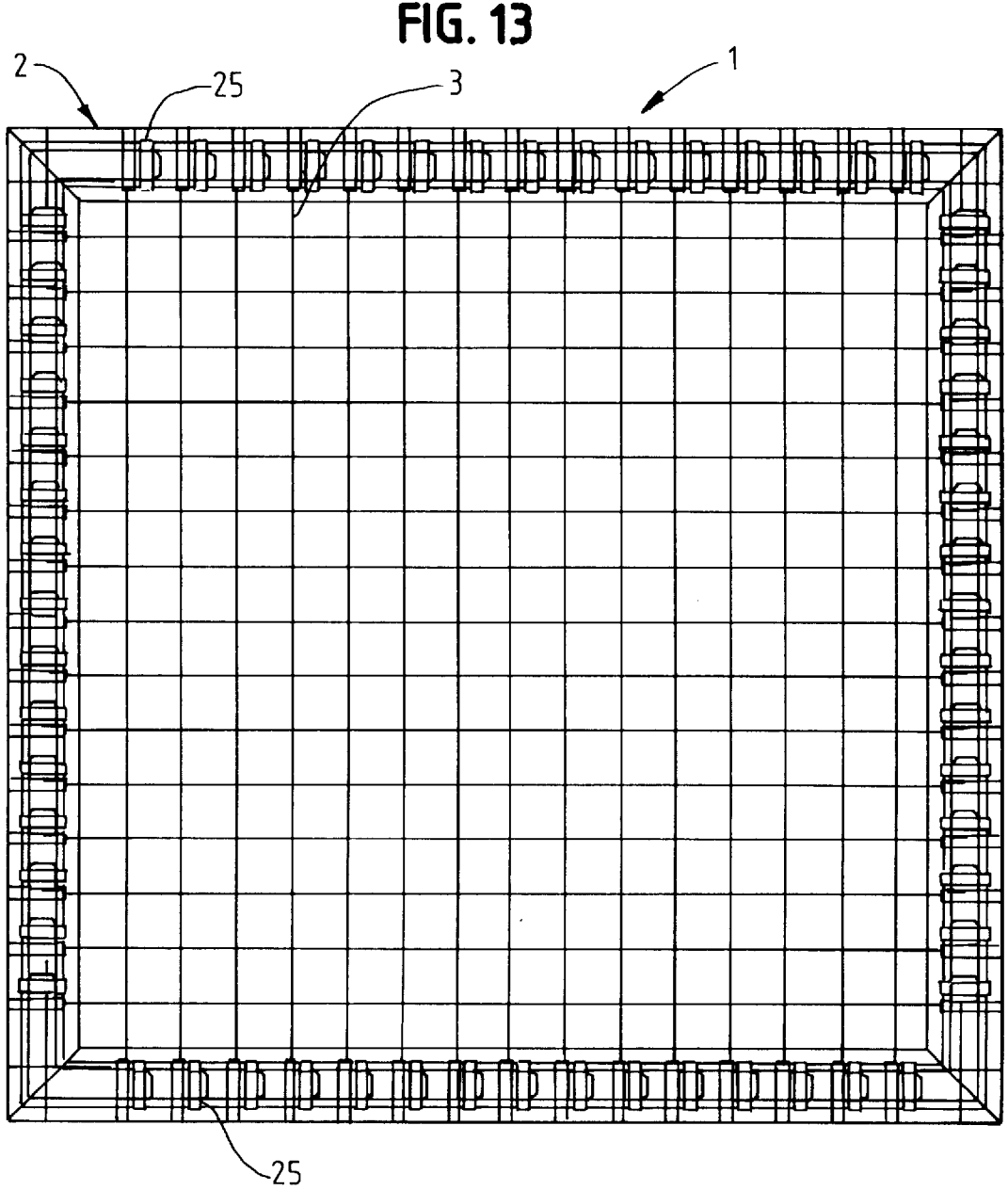
FIG. 13 shows a plane view of the second embodiment of the mould for use by the method according to the invention.
Figure 14:
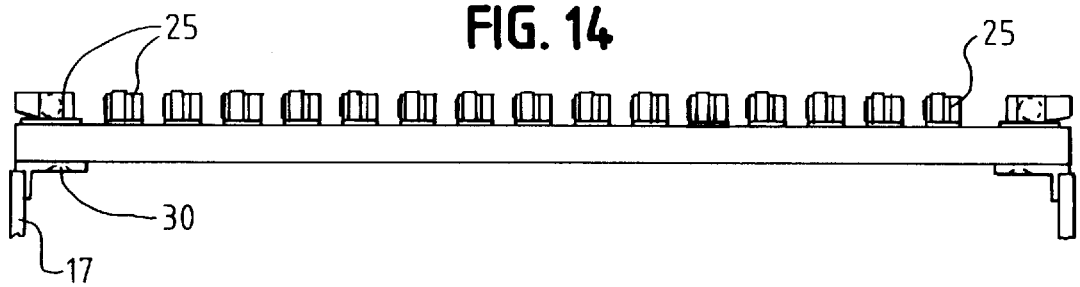
FIG. 14 shows a side view of the mould shown in FIG. 13.

In FIGS. 13, 14 one sees a more detailed view of the frame 2 shown in FIGS. 11 and 12 which is provided with the carrier net 3. Two opposite frame sides, optionally the first and third or second and fourth frame sides, are provided at their bottom with a profile 30 allowing the transport of the carrier frame 1 by means of the automatic transport system 17 through the different process steps.

The frame 2 is provided with a number of clips 25 functioning as described above with reference to FIGS. 11, 12.

The number of clips 25 and consequently of threads in the carrier net 3 may be varied according to requirements.

Hardening plastic or thermoplastic may be used in the process. Heating must be done to different temperatures and serves different purposes, which will be known to a person skilled in the art. When using hardening plastic there will often be a requirement for a heating for initiation of the chemical process of consolidation of the laminate. If thermoplastic is used, the heating is required for accomplishing the very chemical process of laminate consolidation.

The choice of temperature interval and consolidation times will depend on the chosen materials. As this will be known to someone skilled in the art, a more detailed description of this will not be given.

Those fibres forming part of the fibre arrangements 8 may be so-called hybrid yarns. In the present description hybrid yarn is understood to be a yarn consisting of the matrix material and the reinforcement fibres which are lying closely alongside each other like a yarn. It is also possible, however, to use generally known reinforcement fibres such as glass fibres.

According to a particularly advantageous embodiment, the carrier net 3 is formed from the same reinforcement fibres, which are mixed with the same matrix as used in the fibre arrangement. In this manner it is possible that the carrier net, which is released from the frame 2 such as described above, forms part of the finished three-dimensional product without being visible in the finished web. It is also possible to use a carrier net of other types of reinforcement fibres. The carrier net 3 is advantageously formed by means of supplies on rolls which are placed at one side and at one end of the carrier frame 2 and which are displaced automatically across the carrier frame either according to a pattern, in order to form one continuous fibre in the same manner as a racket is stringed, or just in order to provide one or two adjacent fibres in the carrier net. It is not essential how the carrier net is formed on the frame 2. This may also take place manually. It is important, however, that the carrier net frame 2 is provided with the pistons 24 or similar members which make it possible to secure and release the carrier net during the process.

I claim:

1. A method for producing a fibre reinforced three-dimensional product of a plastic material by using a mould in which the product is formed, said mould having at least one edge area, said mould comprising a pressing frame and a lower mould, wherein a plane laminate composed of crossing fibre arrangements is formed containing long fibres which are uniformly oriented and which are mixed with a plastic matrix, wherein the plane laminate is deposited loosely on a carrier net with first ends of the long fibres projecting out from the laminate to form a deposited plane laminate, said carrier net being suspended in a carrier frame, said carrier frame with said plane laminate[] deposited on said carrier net being positioned between said pressing frame and said lower mould, wherein the deposited plane laminate is heated to form a heated plane laminate; wherein only said first ends of the long fibres are secured by securing members in the at least one edge area of the mould, the securing members being activated while second ends of the long fibres are free in the mould and lie proximate a diametrically opposite side of the mould, wherein the carrier net is released from the frame when said first ends of said long fibres are secured by the securing members, wherein the heated plane laminate is pressed into a desired three-dimensional shape to form the fibre-reinforced three-dimensional product under continued securing of the long fibres at said first ends, wherein said long fibres retain their orientation during and after said pressing step, and wherein the fibre-reinforcecd three-dimensional product is released and removed from the mould.

2. The method according to claim 1, wherein the long fibres used have a hybrid yarn shape, and wherein said heating step takes place in a first step of contact heating to a temperature below a sticking temperature of the plastic matrix and a second step of heating to a processing temperature of the plastic matrix.

3. The method according to claim 1 wherein a thermoplastic material is used to form the plastic matrix.

4. The method according to claim 1 wherein a hardening plastic material is used to form the plastic matrix.

5. The method according to claim 1 wherein said step of depositing the plane laminate loosely comprises depositing the crossing fibre arrangements in a polygonal mould in such a manner that each subsequent fibre arrangement of said crossing fibre arrangements is positioned with said first ends of the long fibres at adjacent edges of the at least one edge of said mould.

6. An apparatus adapted for producing a three-dimensional product of a plastic material by using a mould in which the product is formed, said three-dimensional product having a structure which comprises reinforcement fibres configured in a crossing fibre arrangement, the mould having at least one edge, the mould comprising first fibre-securing members along each edge of the at least one mould edge for securing the reinforcement fibres, wherein the apparatus comprises a carrier frame provided with a carrier net which is suspended in the carrier frame and which serves as support for loosely deposited fibre arrangements, said loosely deposited fibre arrangements forming a laminate, and a pressing frame having second fibre-securing members which cooperate with the first rib securing members in securing the reinforcement fibres ony at first ends projecting from the laminate, said apparatus further comprising means for transporting said carrier frame, carrier net and fibre arrangements to and positioning them between said mould and said pressing frame, and means for releasing said carrier net from said carrier frame when said first and second fibre-securing members cooperate to secure the reinforcement fibres.

7. The apparatus according to claim 6 wherein the carrier net is composed of reinforcement fibres mixed with a matrix material that is used in the crossing fibre arrangement.

8. The apparatus according to claim 6 wherein the carrier frame is polygonal.

9. The apparatus according to claim 8 wherein the carrier frame is quadrangular.

10. The apparatus according to claim 6 wherein the first fibre-securing members are constituted of a mould surface designed to cooperate with a surface of the pressing frame used to give the product said desired three-dimensional shape.

11. The apparatus according to claim 6 wherein the carrier net has a larger extent than the laminate so that the second fibre-securing members of the pressing frame and the first fibre-securing members of the mould are located within the carrier frame.

* * * * *